United States Patent [19]

Ueno et al.

[11] Patent Number: 5,352,514
[45] Date of Patent: Oct. 4, 1994

[54] METAL SURFACE ADHERED TO A SECOND METAL SURFACE

[75] Inventors: Seiki Ueno; Masaaki Nakamura, both of Osaka, Japan

[73] Assignee: Nitta Gelatin Inc., Osaka, Japan

[21] Appl. No.: 38,081

[22] Filed: Mar. 29, 1993

Related U.S. Application Data

[62] Division of Ser. No. 690,218, Apr. 24, 1991, abandoned.

[30] Foreign Application Priority Data

| Apr. 25, 1990 | [JP] | Japan | 2-109372 |
| Nov. 22, 1990 | [JP] | Japan | 2-319614 |
| Dec. 28, 1990 | [JP] | Japan | 2-409590 |

[51] Int. Cl.$^5$ .............. B32B 5/16; B32B 15/08; B32B 27/38; B32B 27/40
[52] U.S. Cl. .................... 428/330; 428/323; 428/416; 428/425.8
[58] Field of Search .............. 428/323, 416, 425.8, 428/461, 330

[56] References Cited

U.S. PATENT DOCUMENTS

| 3,098,053 | 7/1963 | Hallonquist | 524/425 |
| 3,371,061 | 2/1968 | Pickett | 524/10 |
| 3,401,141 | 9/1968 | Toth | 524/425 |
| 3,709,300 | 1/1973 | Pye | 166/280 |
| 3,948,830 | 4/1976 | Donnelly et al. | 523/401 |
| 3,959,192 | 5/1976 | Delfosse et al. | 524/425 |
| 4,085,246 | 4/1978 | Buser et al. | 524/437 |
| 4,137,214 | 1/1979 | Sochalski | 524/425 |
| 4,141,864 | 2/1979 | Rijke et al. | 524/417 |
| 4,159,301 | 6/1979 | Buser et al. | 524/437 |
| 4,225,496 | 9/1980 | Columbus et al. | 524/425 |
| 4,257,817 | 3/1981 | Mathur et al. | 524/425 |
| 4,362,828 | 12/1982 | Agarwal et al. | 524/425 |
| 4,379,862 | 4/1983 | Wagner et al. | 528/76 |
| 4,420,341 | 12/1983 | Ferrigno | 523/204 |
| 4,444,937 | 4/1984 | Badertscher | 524/425 |
| 4,456,723 | 6/1984 | Breitenfellner et al. | 524/417 |
| 4,461,643 | 6/1984 | Kaufman | 524/425 |
| 4,469,831 | 9/1984 | Bueltjer et al. | 524/425 |
| 4,506,053 | 3/1985 | Sakurai et al. | 524/425 |
| 4,507,421 | 3/1985 | Symietz | 524/425 |
| 4,547,399 | 10/1985 | Fujihara et al. | 524/399 |
| 4,600,745 | 7/1986 | Creighton | 524/425 |
| 4,642,321 | 2/1987 | Schoenberg et al. | 524/425 |
| 4,657,963 | 4/1987 | Matsumoto et al. | 524/425 |
| 4,687,533 | 8/1987 | Rizk et al. | 524/588 |
| 4,780,507 | 10/1988 | Gaku et al. | 524/425 |
| 4,846,905 | 7/1989 | Tarbutton et al. | 525/169 |
| 4,847,319 | 7/1989 | Bandlish | 524/188 |
| 4,918,136 | 4/1990 | Kawaguchi et al. | 523/116 |
| 5,036,125 | 7/1991 | Perrin | 524/425 |
| 5,055,497 | 10/1991 | Okada et al. | 523/116 |
| 5,162,087 | 8/1991 | Fukuzawa et al. | 524/430 |

FOREIGN PATENT DOCUMENTS

| 56-90868 | 7/1981 | Japan . |
| 56-33435 | 8/1981 | Japan . |
| 61-41537 | 2/1986 | Japan . |
| 62-290765 | 12/1987 | Japan . |
| 63-6074 | 1/1988 | Japan . |
| 2-8633 | 2/1990 | Japan . |
| 2-150484 | 6/1990 | Japan . |
| 2-150485 | 6/1990 | Japan . |

OTHER PUBLICATIONS

Biomaterials 1989, vol. 10, April, pp. 185–186.
World Patents Index Latest, Section Ch, Week 8831,
(List continued on next page.)

Primary Examiner—Paul R. Michl
Assistant Examiner—Peter Szekely
Attorney, Agent, or Firm—Nikaido, Marmelstein, Murray & Oram

[57] ABSTRACT

A favorable adhesive strength can be obtained without requiring pretreatment of metal surfaces in adhering.

The invention relates to an adhesive composition having a biological calcium compound added as an adhesion improver. The biological calcium compound is at least one type selected from a group comprising, for example, hydroxyapatite, seashells and egg shells.

6 Claims, No Drawings

OTHER PUBLICATIONS

Derwent Publications Ltd. London, GB; Class A, AN 88-217609 & JP-A-93154779 (Asahi Optical KK), Jun. 28, 1988.

Chemical Abstracts, vol. 111, Columbus, Oh., U.S.: Abstract No. 79188J, Modif. Polim, Mater, 15, 38–45 (1987); A. Jansons et al.: 'Adhesive Activity of Polyethylene Compositions Containing Available Fillers'.

Patent Abstracts of Japan, vol. 9, No. 28 (C-264) (1751) Feb. 6, 1985 and JP-A-59172570 (Ashimori Kogyo KK) Sep. 29, 1984.

World Patents Index Latest, Week 9049, Derwent Publications, Ltd., London, GB; AN 90-365450, & JP-A-2263878 (Daiichi Kogyo Seiyaku et al.) Oct. 26, 1990.

World Patents Index, Week 7618, Derwent Publications Ltd., London, GB; AN 76-32887X & JP-A-51031737 (Mitsui Toatsu Chem Inc.) Mar. 19, 1976.

METAL SURFACE ADHERED TO A SECOND METAL SURFACE

This application is a division of application Ser. No. 07/690,218 filed on Apr. 24, 1991 now abandoned.

BACKGROUND OF THE INVENTION

The present invention relates to an adhesive composition.

Conventionally, to adhere metals such as aluminum, the metal surface to be adhered was generally pretreated with chemical treatment such as FPL etching and phosphoric acid anodization. It was intended to obtain a firm adhesive performance by removing the surface soiling, oil, or weak oxide film to form a strong oxide film, or toughening the surface by etching or the like.

In the case of an adhesive which requires pretreatment of the adherend chemically or physically, considering the working efficiency and total cost of adhesion, it is extremely complicated in operation for use in an assembly process of constituent parts of electric products (devices), furniture, automobiles, or the like. It is therefore considered a very important improvement to change the design of the adhesive so as to exhibit a favorable adhesion without resort to the existing pretreatment process.

There have been proposed adhesives presenting a favorable adhesion by applying them directly on the metal surface without carrying out pretreatment. For example, the Japanese Official Patent Provisional Publication, Showa 63-6074, has proposes a water-based dispersion adhesive prepared by adding monovalent sodium phosphate or trimethyl phosphate to an ethylene-based ionomer resin dispersion. This adhesive is used in adhesion of aluminum foil with the ethylene-based ionomer resin film or polyester film, and as compared with other adhesives not containing sodium phosphate or trimethyl phosphate, the 180° peeling-off strength is improved. The Japanese Official Patent Gazette, Heisei 2-8633, has proposes a curable polyurethane adhesive composition comprising diphenylmethane diisocyanate modified matter, polyol, and organic phosphate compound possessing at least one —SH group. This adhesive is used in adhesion of iron piece treated by sand blasting, and stainless steel, aluminum, copper, zinc, tin, and zinc plated chromate-treated material, and the peeling strength is improved as compared with an adhesive not containing the organic phosphate compound.

The adhesives proposed in these two publications possess a satisfactory adhesive power, but the adhesive strength is not sufficient when used in applications requiring greater adhesion property such as adhesion of metal to metal for automobile.

SUMMARY OF THE INVENTION

It is hence a primary object of the invention to present an adhesive composition that does not require pretreatment of metal surface in adhesion and is capable of getting favorable adhesive strength.

To achieve the above object, the invention presents an adhesive composition containing a biological calcium compound (hereinafter, referred as "bio-Ca compound") as an adhesion improver.

The present inventors, as a result of accumulated studies for solving the problems involved in the conventional adhesives, have discovered the following. That is, in the conventional adhesives, sodium phosphate, trimethyl phosphate, or organic phosphate compound that is capable of bonding with the oxide film chemically was used in order to enhance a bonding force with the oxide film of a metal surface which is not pretreated on the adhered surface, but an interaction of these compounds with matrix composition was not sufficiently taken into consideration.

Accordingly, the inventors considered that the compounds to be added in order to improve the bonding force with the adhesive with the oxide film of the non-pretreated metal surface could improve an adhesive power of the entire adhesive if they could exhibit an interaction also with the matrix composition in the adhesive layer, and have reached completion of the invention having the above composition.

The bio-Ca compound is a biological derivative among compounds containing calcium, for example, a compound formed by calcification. Practical examples of the bio-Ca compound includes seashells (e.g. scallop, clam, short-necked clam, freshwater clam), egg shell, hydroxyapatite (HAp), and limestone, and only one maybe used alone or two or more types may be combined. They are properly cleaned, crushed, and used in powder form of a mean particle size of 10 $\mu$m or less. If greater than this particle size, the adhesion performance may be poor. In the invention, however, the bio-Ca compound does not include materials obtained by chemical synthesis, such as light calcium carbonate, its high purity flour, and a calcium compound reagent.

The HAp is an inorganic filler of which typical structural formula is $M_{10}(ZO_4)_6(OH)_2$ [where M is Ca or Pb; Z is As, P, or V], and it is generally $Ca_{10}(PO_4)_6(OH)_2$. The HAp used in the invention contains impurities of about 0.1 to 0.5 ppm generally, but there is no problem for the performance.

An adding amount of the bio-Ca compound is not particularly limited, but it prefers to be in proportion of to 8 parts by weight (hereinafter, "parts" used herein means "parts by weight") against 100 parts of a matrix composition. Out of this range, the additive effect of the bio-Ca compound may not be revealed.

The adhesive composition of the present invention comprises, as the matrix composition, an isocyanate compound possessing two or more isocyanate groups, epoxy resin, acrylic resin, epoxy resin or other resin modified with toughener such as rubber, and other thermoplastic elastic polymers such as a rubber and thermoplastic elastomer. The matrix composition is not particularly limited, but preferably has a synthetic resin containing a functional group. The matrix composition may be properly combined depending on an use of the adhesive or the like. For example, only one of the above resins and thermoplastic elastic polishers may be used alone, or two or more types may be combined. In a case of the combination, for example, modified resins of an epoxy resin and a reactive elastomer, and a polymer blend of an isocyanate compound and a polyester resin may be listed. When two or more compounds out of resins and thermoplastic elastic polishers are used in combination, the ratio may be properly set depending on the resin combination or the like, and is not particularly limited.

As the isocyanate compound possessing two or more isocyanate groups to be used in the present invention, for example, an urethane prepolymer is known. The urethane prepolymer is desired to have an amine equivalent of 450 to 1,500, or more preferably 500 to 800. An urethane prepolymer having such a range of amine equivalents has the number-average molecular weight of, for example, 1,000 to 4,000. Meanwhile, if the amine equivalent (or the number-average molecular weight) is lower than the specified range, since the molecular weight is small, the toughness after crosslinking may be insufficient, and if exceeding the range, the viscosity becomes very high, and handling may be difficult. The isocyanate compound to be used herein is not particularly limited as far as possessing two or more isocyanate groups. Examples of the urethane prepolymer include, for example, isocyanate derivatives such as trilenediisocyanate-based urethane prepolymer, methylenediphenyldiisocyanate-base urethane prepolymer, hexamethylenediisocyanate-based urethane prepolymer, xylylenediisocyanate-based urethane prepolymer, isophoronediisocyanate-based urethane prepolymer, which may be used alone or in combination of two or more.

When using the above-mentioned isocyanate compound possessing two or more isocyanate groups as the matrix composition, an epoxy resin or the like may be used as required for a purpose of improving the adhesion. A formulating ratio of the isocyanate compound and epoxy resin is, for example, 5 to 25 parts of the epoxy resin to 100 parts of the isocyanate compound.

As the epoxy resin used in the present invention, there is no particular limitation as far as the compound possesses two or more epoxy groups, and typical examples are an epoxy resin of bisphenol A type, an epoxy resin of bisphenol F type, an epoxy resin of phenol novolak type, and their modified resins, which may be used either alone or in combination of two or more. The epoxy resin preferably have an epoxy equivalent of 180 to 700, or more preferably 180 to 200. If the epoxy equivalent is lower than the above range, the molecular weight is low, and brittleness may reveal, or if excessive, the molecular weight becomes high, and the resin may solidify and is hard to handle.

When using the above epoxy resin as the matrix composition, various reactive elastomers may be used for enhancing the adhesion property as required. They may be blended by 5 to 100 parts to 100 parts of an epoxy resin.

The acrylic resin used in the present invention is, for example, of a two-liquid mixed type and hardens as the main agent (a matrix composition) reacts chemically by action of a curing-assisting catalyst. The main agent is composed of an elastomer and acrylic monomer, a curing catalyst (for example, a peroxide), and a stabilizer. In a case of SGA (second generation acryl), it is characteristic to contain a chlorosulfoyl group ($SO_2Cl$) in the elastomer composition. The curing catalyst acts for elongation of a main chain, and the curing promoter promotes it. The curing promoter is, for example, an initiating catalyst of a redox system, and the condensation compound between an aldehyde compound and an aniline is generally known.

The thermoplastic elastic polymer used in the invention is not particularly limited, and typical examples are thermoplastic elastomers such as chloroprene-based rubber, SBR (styrene-butadiene two-dimensional random copolymer), SBS (styrene-butadine-styrene three-dimensional block copolymer), SIS (styrene-isoprene-styrene three-dimensional block copolymer), EVA (ethylene-vinyl acetate copolymer), and α-olefin copolymer.

The adhesive composition of the present invention may contain one or more components, as required, in addition to the above ingredients. For example, a solvent, hardener, curing accelerator, tackifier resin, wax, and an antioxidant may be cited.

The forementioned isocyanate compound is hardened in the presence of moisture contained in the air or atmosphere, or by a curing agent, and forms a three-dimensional crosslinking structure. As the hardener, for example, a compound having one or more active hydrogen (may be called as an active hydrogen compound) is used. Practical examples of such compounds include an aromatic polyamine, aliphatic polyamine, a polyol, polycarboxylic acid, polyamide, and phenols, which may be used either alone or in combination of two or more. When using a hardener, the formulating is not particularly defined, but it is desired to add it in a theoretically ideal amount derived by calculating the stoichiometric ratio between the forementioned isocyanate compound and the active hydrogen compound.

When using the epoxy resin, a proper hardener and curing accelerator are used. In the present invention, when using an epoxy resin as the matrix composition, an aromatic polyamine, aliphatic polyamine, a thiol, polymercaptane or the like may be used as the hardener, and tertiary amine, carboxylic acid, phenol, or addition product of an epoxy resin with a compound having a tertiary amino group may be used as the curing accelerator. An adding amount of the hardener is determined by calculating the stoichiometric ratio between the epoxy resin and the active hydrogen compound. The curing accelerator is added by 1 to 10 wt. % (against the whole weight of an epoxy resin), for example. As a toughener for the epoxy resin, for example, it is also possible to add a reactive elastomer which is other liquid rubbers, and a modified epoxy resin modified by them.

The formulating parts of forementioned other components is not particularly limited, but may be, for example, 0 to 100 parts to 100 parts of an isocyanate compound.

The adhesive composition of the present invention may be used as a reactive hot melt adhesive by using the above isocyanate compound and bio-Ca compound. In this case, usually, curing of the isocyanate compound occurs due to moisture. Also, by using a thermoplastic urethane prepolymer as the isocyanate compound and a bio-Ca compound, it may be used as a reactive hot melt adhesive.

The adhesive composition of the present invention may be used in adhesion between metals (for example, iron, aluminum, zinc, copper), or adhesion of a metal and another adherend (for example, glass, plastic, timber). When applied to the adherend, the thickness is, for example, 0.3 to 0.5 mm. In a case of metals, if coated without pretreatment, it is bonded with an oxide film to build up a strong adhesion property. If a film of an oily substance exists on the surface, it also displays powerful adhesion. Accordingly, the adhesive composition of the invention, for example, may be used in adhesion between metals for automobiles, between glass and metal, or between plastic and metal. The adhesive composition of the invention may be also used as a sealant.

Since bio-Ca compound is added as an adhesive improver, the bio-Ca compound interacts with an oxide film on a metal surface, or the bio-Ca compound may interact with the matrix composition in the adhesive.

Accordingly, without carrying out pretreatment (for example, chemical treatment) of the metal surface, adhering is possible, and the adhesion property is excellent for long.

When an isocyanate compound is used as the matrix composition, curing reaction occurs between the isocyanate compound and an active hydrogen compound, thereby forming a crosslinking structure.

When an epoxy resin is used as the matrix composition, an epoxy ring (oxirane ring) of the epoxy resin reacts with the active hydrogen in an active hydrogen compound to open the ring forming a three-dimensional crosslinking structure in series, thereby forming a tough adhesive layer.

When an acrylic resin is used as the matrix composition, a main component such as an elastomer and a acrylic monomer, curing catalyst, and stabilizer are combined with a curing promoter, and, for example, the acrylic monomer is polymerized at room temperature, or partly graft polymerization with the elastomer occurs, thereby forming a tough adhesive layer.

When a thermoplastic elastic polymer is used as the matrix composition, although a chemical interaction does not occur in a solvent type the adhesion property is revealed by evaporating a solvent, or in a hot melt type the hot melt material is cooled to room temperature to reveal the adhesion property.

The adhesive composition relating to the present invention is as described above, and in actual adhesion operation, pretreatment of a metal surface is unnecessary, and an excellent adhesion is obtained.

DESCRIPTION OF THE PREFERRED EMBODIMENTS

Embodiments of the present invention are described below together with comparison examples, but the invention is not limited to the undermentioned embodiments.

EXAMPLE 1

Using 8.0 parts of an urethane prepolymer (produced by Takeda Chemical Industries, Ltd-) having an amine equivalent of 650, which is synthesized from TDI (trilenediisocyanate) and PTMG (poly (oxytetramethlene) glycol), 1.0 part of an aromatic polyamine (made by Ciba-Geigy (Japan) Ltd., an amine value of 8.0 to 8.9 mol/kg, liquid), and 0.1 part of HAp (tradename "Hydroxyapatite BC" of Nitta Gelatin Inc., mean particle size 5 $\mu$m, particle size distribution in a range of 4 to 12 $\mu$m, granular), an adhesive composition was prepared by agitating and mixing until the HAp becomes uniform in a 100 ml polyethylene (PE) beaker at room temperature.

EXAMPLES 2 TO 4 AND COMPARISON 1

Adhesive compositions were prepared in the same procedure as in Example 1, by formulating as shown in Table 1.

Of the adhesive compositions obtained, the peeling strength was investigated, and the results are shown in Table 1.

For measurement of peeling strength, an aluminum plate of 150 mm $\times$ 150 mm $\times$ 0.3 mm thickness was used without surface treatment. On this aluminum plate, the adhesive composition was applied in a coating thickness of 0.3 to 0.4 mm by means of a doctor blade, and two aluminum plates were applied together by inserting a 0.4 mm spacer. The curing was cured under conditions of 160° C., 15 minutes, and 50 kg/cm$^2$ by means of a heat press. Afterwards, the test piece was cut in 25 mm width, and the stationary adhesive peeling strength was measured at a temperature of 23° C., in 65% RH, at crosshead speed of 300 mm/min by means of Instron type autograph model S-2000 made by Shimadzu Corporation. This method conforms to JIS K 6854-77. The fracture extent was classified as A for an adhesive failure, AC for mixed adhesive/cohesive failure, and C for cohesive failure, by observing the positions peeled at the time of peeling strength measurement.

TABLE 1

|  | Comparison 1 | Example 1 | Example 2 | Example 3 | Example 4 |
| --- | --- | --- | --- | --- | --- |
| Formulating (parts) | | | | | |
| Urethane prepolymer | 8.0 | 8.0 | 8.0 | 8.0 | 8.0 |
| Polyamine | 1.0 | 1.0 | 1.0 | 1.0 | 1.0 |
| HAp | — | 0.1 | 0.5 | 0.8 | 1.0 |
| T-peel strength [kg/25 mm] | 15.8 | 22.5 | 29.0 | 25.0 | 19.3 |
| Fracture type | A | AC | C | AC | A |

As shown in Table 1, by varying the adding amount of HAp, the adhesion reaches a peak at a certain ratio, that is, at 0.5 parts to 8.0 parts of an isocyanate compound.

EXAMPLES 5 TO 8

Adhesive compositions were prepared in the same procedure as in Examples 1 to 4, except that the HAp had a mean particle size of 8 $\mu$m and a particle size distribution of 4 to 12 $\mu$m. Of these adhesive compositions, exactly the same results as in Examples 1 to 4 were obtained.

EXAMPLES 9, 10 AND COMPARISON 2

Adhesive compositions were prepared in the same procedure as in Example 1, with the formulating as shown in Table 2. The epoxy resin A is an elastomer-modified epoxy resin (epoxy equivalent 300) produced by Mitsui Toatsu Chemicals Inc. The polyamine and HAp were same as those used in Example 1.

Using the adhesive compositions obtained, the peeling strength and fracture type were investigated in the same procedure to the above except that the curing time was 45 minutes, of which results are shown in Table 2.

TABLE 2

|  | Comparison 2 | Example 9 | Example 10 |
| --- | --- | --- | --- |
| Formulating (parts) | | | |
| Epoxy resin A | 10.0 | 10.0 | 10.0 |
| Polyamine | 2.0 | 2.0 | 2.0 |
| HAp | — | 0.5 | 1.0 |
| T-peel strength [kg/25 mm] | 8.0 | 11.2 | 10.4 |
| Fracture type | A | AC | A |

As shown in Table 2, also in the adhesive compositions using the epoxy resin as a matrix composition, the adhesion property was improved by adding the HAp.

EXAMPLES 11, 12 AND COMPARISONS 3, 4

Adhesive compositions were prepared in the same procedure as in Example 1, with the formulating as shown in Table 3. The urethane prepolymer, polyamine, and HAp were same as those used in Example 1. The epoxy resin B was an epoxy resin of bisphenol A type (epoxy equivalent 190) produced by Dainippon Ink And Chemicals, Inc. the epoxy/resin C was an epoxy resin of bisphenol A type (epoxy equivalent 190) of Yuka Shell Epoxy Co., and DICY was a dicyandiamide produced by Nippon Carbide Co., Ltd.

Using the adhesive compositions obtained, the peeling strength and fracture mode were investigated in the same procedure as in Example 1, of which results are shown in Table 3.

TABLE 3

| | Comparison 3 | Example 11 | Comparison 4 | Example 12 |
| --- | --- | --- | --- | --- |
| Formulating (parts) | | | | |
| Urethane prepolymer | 8.0 | 8.0 | 8.0 | 8.0 |
| Epoxy resin B | 2.0 | 2.0 | — | — |
| Epoxy resin C | — | — | 2.0 | 2.0 |
| Polyamine | 1.0 | 1.0 | 1.0 | 1.0 |
| DICY | 0.2 | 0.2 | 0.2 | 0.2 |
| HAp | — | 0.5 | — | 0.5 |
| T-peel strength [kg/25 mm] | 25.6 | 35.0 | 25.6 | 35.0 |
| Fracture type | AC | C | AC | C |

As shown in Table 3, also in the adhesive compositions which have used an isocyanate compound as the matrix composition and an epoxy resin in combination for improvement of adhesive performance, the peeling strength was improved with an addition of HAp.

EXAMPLE 13 AND COMPARISONS 5 TO 7

Adhesive compositions were prepared in the same procedure as in Example 1, with the formulating as shown in Table 4. The urethane prepolymer, polyamine and HAp used were the same as those in Example 1. The epoxy resin D was an epoxy resin of a naphthalene type (epoxy equivalent 146) produced by Dainippon Ink And Chemicals, Inc.

Using the adhesive compositions obtained, the peeling strength and fracture mode were studied in the same manner as in Example 1, of which results are shown in Table 4.

Thus, comparing HAp with other phosphates, it is that HAp brings about the best result. The factor of this favorable result is considered to be a bond between a hydroxy group of the HAp and an isocyanate group of the urethane prepolymer. In the phosphates used in Comparisons such as sodium metaphosphate and dipotassium hydrogen phosphate, the hydroxy group is not present in the composition and chemical interaction does not occur, which is considered why the adhesive performance was lower than the embodiments using HAp. Incidentally, in the Japanese Official Patent Gazette Heisei 2-8633, an example of adding an organic phosphate compound possessing a —SH group (thiol group) at one terminal end is disclosed, but the —SH group is poor in reactivity as compared with the OH group. Considering synthesis of the organic phosphate compound or addition conditions, the synthesis is complicated and its cost is high, and such a material is not available commercially. By contrast, in the embodiments, using the HAp easily available and inexpensive, a further superior performance is obtained.

EXAMPLES 14, 15 AND COMPARISONS 8, 9

Adhesive compositions were prepared in the same procedure as in Table 1, with the formulating as shown in Table 5. The epoxy resins A, B, D and DICY were same as those used above. The latent hardener A was a product of Ajinomoto Co., Inc., being an addition reaction product of an epoxy resin with a compound having a tertiary amino group.

Using the adhesive compositions obtained, the lap shear strength was investigated according to the following procedure, and the results are shown in Table 5.

Aluminum plates of 25 mm by 100 mm by 1.6 mm thickness (standard test pieces of Nippon Test Panel Co., Ltd.) were used without surface treatment. The adhesive compositions were coated on both of two

TABLE 4

| | Comparison 5 | Example 13 | Comparison 6 | Comparison 7 |
| --- | --- | --- | --- | --- |
| Formulating (parts) | | | | |
| Urethane prepolymer | 8.0 | 8.0 | 8.0 | 8.0 |
| Epoxy resin D | 2.0 | 2.0 | 2.0 | 2.0 |
| Polyamine | 1.0 | 1.0 | 1.0 | 1.0 |
| DICY | 0.2 | 0.2 | 0.2 | 0.2 |
| HAp | — | 0.5 | — | — |
| Sodium metaphosphate | — | — | 0.5 | — |
| Dipotassium hydrogen phosphate | — | — | — | 0.5 |
| T-peel strength [kg/25 mm] | 28.5 | 40.4 | 30.6 | 23.8 |
| Fracture type | AC | C | AC | AC |

As shown in Table 4, in Example 13 using HAp, the peeling strength is extremely higher as compared with Comparison 5 without adding the phosphate compound. Also, as compared with Comparisons 6, 7 using other phosphate compounds the peeling strength is very high.

aluminum plates, which were joined in an overlapping area of 12.5 mm×25.0 mm, clamped under pressure with a clip (pressure, 50 kg/cm$^2$), and were separately cured under two curing conditions of, 120° C. for 30 minutes and 160° C. for 30 minutes. Of the test pieces obtained, conforming to JIS K 6850, the stationary Lap shear strength was measured in an atmosphere of 23° C. and 65% RH by means of Instron type Shimadzu autograph S-2000 at a cross-head speed of 50 mm/min. The Lap shear strength was expressed by dividing the measured strength by the overlapping area. The substrate break (broken) of 150 kg/cm² ≦ indicates that an aluminum plate was cut off at 150 kg/cm² or more.

The fracture mode was classified into C for cohesive failure, AC for adhesive/cohesive failure, and A for adhesive failure, by observing the fracture state of the adhesive layer on the overlapped surface.

TABLE 5

|  | Example 14 | Comparison 8 | Example 15 | Comparison 9 |
|---|---|---|---|---|
| Formulating (parts) | | | | |
| Epoxy resin B | 10.0 | 10.0 | — | — |
| Epoxy resin D | — | — | 10.0 | 10.0 |
| Epoxy resin A | 2.5 | 2.5 | 2.5 | 2.5 |
| HAp | 0.5 | — | 0.5 | — |
| DICY | 0.2 | 0.2 | 0.2 | 0.2 |
| Latent hardener A | 0.2 | 0.2 | 0.2 | 0.2 |
| Polyamine | 2.7 | 2.7 | 4.1 | 4.1 |
| Lap shear strength (kg/cm²) (curing condition; 120° C., 30 min) and fracture type | 54.4 AC | 31.9 AC | 96.6 AC | 87.6 AC |
| Lap shear strength (kg/cm²) (curing condition; 160° C., 30 min) and fracture type | 150≦ Substrate break | 130 C | 150≦ Substrate break | 130 C |

As shown in Table 5, the strength was evidently different between the HAp-added series and HAp-free series. When the curing temperature was changed from 120° C. to 160° C., a more obvious difference was observed. This is considered because the HAp is effective as adhesion improver for aluminum by the same reason as explained above.

EXAMPLES 16, 17 AND COMPARISON 10, 11

Adhesive compositions were prepared in the same procedure as in Example 1, with the formulating as shown in Table 6. The HAp was same as that used in Example 1. Acrylic-based adhesive was a general household acrylic-based adhesive of a two-liquid type of Konishi Co., Ltd. and, to 100 parts of this base, 5 parts of HAp was added. The rubber adhesive (a thermoplastic elastic polisher-based adhesive) used was an industrial solvent base rubber adhesive of Sunstar Giken Co., Ltd. and, to 100 parts of this adhesive, HAp was added by 5 parts.

Using the obtained adhesive compositions, the Lap shear strength was investigated as follows, of which results are shown in Table 6.

Aluminum plates of 25 mm by 100 mm by 1.6 mm thickness (standard test pieces of Nippon Test Panel Co., Ltd. were used without surface treatment. Adhesive compositions were coated on two aluminum plates, and the pieces were joined in an overlapping area of 12.5 mm×25.0 mm, clamped under pressure with a clip (pressure 50 kg/cm²), and cured for 5 days at room temperature. For the test pieces obtained, the stationary Lap shear strength was measured in the same procedure as in Example 14.

TABLE 6

|  | Example 16 | Comparison 10 | Example 17 | Comparison 11 |
|---|---|---|---|---|
| Formulating (parts) | | | | |
| Acrylic adhesive (matric composition: 95 wt. %) | 10.0 | 10.0 | — | — |
| Solvent base rubber adhesive (matrix composition: 30 wt. %) | — | — | 10.0 | 10.0 |
| HAp | 0.5 | — | 0.15 | — |
| Lap shear strength (kg/cm²) (curing condition; Room temperature, 5 days) fracture type | 85.0 A | 50.1 A | 23.4 A | 17.5 A |

As shown in Table 6, also in the adhesive using acrylic resin or rubber as a matrix composition, it is known that the adhesive performance was improved by addition of HAp.

EXAMPLE 18

Into a separable flask was placed 100 parts of a copolymer diol of polyhexamethylene adipate and polyneopentylene adipate made by Nippon Polyurethane Kogyo Co., Ltd., which was warmed to 100° C. at a reduced pressure of 3 mmHg to be dehydrated for 2 hours. In succession, charging 25 parts of MDI (methylene diphenyl diisocyanate), under a nitrogen stream, a reaction was conducted for 4 hours at 95° C., whereby a polyester-based urethane prepolymer was obtained. At this time, the amine equivalent was about 1250. To 70 parts of this urethane prepolymer, 30 parts of saturated polyester resin made by Nippon Gosei Kagaku Co., Ltd. was mingled under a nitrogen stream during 30 minutes at 120° C. To the mixture obtained was added, 5 parts of hydroxy apatite BC (made by Nitta Gelatin Inc., mean particle size 4–5 μm, particle size distribution 4–12 μm, powder), whereby a reactive hot melt adhesive was obtained.

EXAMPLE 19 AND COMPARISONS 12, 13

Reactive hot melt adhesives (adhesive compositions) were obtained in the same procedure as in Example 18, with the formulating as shown in Table 7. The polyester-based urethane prepolymer was the same as used in Example 18.

For the reactive hot melt adhesive of Examples 18, 19 and Comparisons 12, 13, the melt viscosity, complete cured adhesion, and fracture type (evaluation was as metnioned above) were investigated, of which results are shown in Table 7.

The complete cured adhesion was measured by coating the adhesive compositions in a molten state and applying the adherends (the forementioned two aluminum plates) and, after letting stand for 1 week at 23° C. and 65% RH, by measuring the stationary peeling strength in the same procedure.

obtained in the same procedure as in Example 1, with the formulating as shown in Table 8.

For the adhesive compositions obtained, the peeling strength adhesion test was conducted. Aluminum plates of 150 mm by 0.3 mm thickness (A-1050P specified by the JIS H 4000) were used without surface treatment.

TABLE 7

|  | Example 18 | Example 19 | Comparison 12 | Comparison 13 |
|---|---|---|---|---|
| Formulating (parts) | | | | |
| Urethane prepolymer *1 | 70 | 50 | 70 | 50 |
| Saturated polyester resin *2 | 30 | 50 | 30 | 50 |
| HAp *3 | 5 | 5 | — | — |
| Melt viscosity [cP] (120° C.) | 35,000 | 45,000 | 27,000 | 32,000 |
| Complete cured adhesion (T-peel strength) [kg/25 mm] *4 | 25.0 | 20.0 | 14.5 | 12.0 |
| Fracture type | AC | AC | A | A |

(Notes)
*1 Polyester urethane prepolymer
*2 Saturated polyester resin of Nippon Gosei Kagaku Ind. Co., Ltd.
*3 HAp of Nitta Gelatin Inc.
*4 Adherends are aluminum/aluminum.

As shown in Table 7, also in reactive hot melt adhesives, the peeling strength becomes very high by adding HAp.

Preparation of bio-Ca Compound

Shells of scallop and clam were, respectively, immersed in methanol for 24 hours, and immersed in tap water for another 24 hours to rinse sufficiently, and after removing moisture for more than 10 hours in a non-circulating thermostat of a heater type, the shells were crushed by a ball mill and passed through a 400-mesh sieve (Tyler standard sieve, same hereinafter), whereby scallop shell powder (hereinafter, may be referred as "scallop" for short) and clam shell powder ("clam" for short) were obtained.

On the other hand, egg shells (trade name Calhope made by Kewpie Co., Ltd.) were sieved, and powder passing a 400-mesh sieve was obtained.

Synthetic Calcium Compound

A reagent grade product (a specially pure grade) of calcium carbonate obtained by synthesis was crushed and sieved, and powder passing the 400-mesh was obtained.

EXAMPLES 20 TO 22 AND COMPARISONS 14, 15

Using the same urethane prepolymer and aromatic polyamine as used in Example 1, scallop shell powder and synthetic calcium carbonate powder were used as the calcium compound. Adhesive compositions were obtained in the same procedure as in Example 1, with the formulating as shown in Table 8.

For the adhesive compositions obtained, the peeling strength adhesion test was conducted. Aluminum plates of 150 mm by 0.3 mm thickness (A-1050P specified by the JIS H 4000) were used without surface treatment. On the aluminum plates, the adhesive compositions were coated in a coating thickness of 0.3–0.4 mm by using a doctor blade, and the aluminum plates were applied together by inserting a 0.4 mm spacer, and were cured by a heat press under the conditions of 120° C., 15 minutes, and 50 kg/cm². Then, the stationary peeling strength was measured in the same manner as in Examples 1 to 4, of which results are shown in Table 8.

TABLE 8

|  | Comparison 14 | Example 20 | Example 21 | Example 22 | Comparison 15 |
|---|---|---|---|---|---|
| Formulating (parts) | | | | | |
| Urethane polymer | 9.5 | 9.5 | 9.5 | 9.5 | 9.5 |
| Aromatic polyamine | 1.2 | 1.2 | 1.2 | 1.2 | 1.2 |
| Scallop shell powder | — | 0.2 | 0.5 | 1.0 | — |
| Synthetic calcium carbonate powder | — | — | — | — | 0.5 |
| T-peel strength [kg/25 mm] | 6.5 | 7.5 | 12.5 | 8.0 | 6.0 |
| Fracture type | A | A | AC | A | A |

EXAMPLES 23 TO 25 AND COMPARISONS 16, 17

Including use of the epoxy resin B same as used in Example 11, and the aromatic polyamine same as used in Example 1, scallop shell powder and synthetic calcium powder were used as the calcium compound. The adhesive compositions were obtained in the same procedure as in Example 1, he formulating as shown in Table 9.

For the obtained adhesive compositions, the lap shear strength tests were conducted. Aluminum plates of 25 mm by 100 mm 1.6 mm thickness (A-1050P specified by the JIS H 4000) were used without surface treatment. The adhesive compositions were coated onto both of two aluminum plates, which were joined in an overlapping area of 12.5 mm×25.0 mm, and were clampted under pressure with a clip (pressure 50 kg/cm²), and cured under the conditions of 160° C. and 30 minutes. Then, in the same procedure as in Examples 14, 15, the stationary Lap shear strength was measured, of which results are shown in Table 9.

TABLE 9

|  | Comparison 16 | Example 23 | Example 24 | Example 25 | Comparison 17 |
|---|---|---|---|---|---|
| Formulating (parts) | | | | | |
| Epoxy resin B | 10.0 | 10.0 | 10.0 | 10.0 | 10.0 |
| Aromatic polyamine | 2.7 | 2.7 | 2.7 | 2.7 | 2.7 |
| Scallop shell powder | — | 0.2 | 0.5 | 1.0 | — |
| Synthetic calcium carbonate powder | — | — | — | — | 0.5 |

TABLE 9-continued

|  | Comparison 16 | Example 23 | Example 24 | Example 25 | Comparison 17 |
|---|---|---|---|---|---|
| Lap shear strength [kg/cm$^2$] | 90 | 100 | 120 | 105 | 8.5 |
| Fracture type | A | A | AC | A | A |

As seen in Tables 8, 9, when using the biological calcium compounds, the adhesion property was improved as compared with the cases where synthetic calcium compounds were used.

EXAMPLES 26, 27 AND COMPARISON 18, 19

Adhesive compositions were obtained in the same procedure as in Examples 16, 17, with the formulating as shown in Table 10.

In the adhesive compositions obtained, the Lap shear strength tests were conducted in the same manner as in Examples 16, 17, and the results as shown in Table 10 were obtained.

TABLE 10

|  | Example 26 | Comparison 18 | Example 27 | Comparison 19 |
|---|---|---|---|---|
| Formulating (parts) |  |  |  |  |
| Acrylic adhesive (matrix composition: 95 wt. %) | 10.0 | 10.0 | — | — |
| Solvent base rubber adhesive (matrix composition: 30 wt. %) | — | — | 10.0 | 10.0 |
| Scallop shell powder | 0.5 | — | 0.15 | — |
| T-peel strength [kg/cm$^2$] (curing condition; Room temperature 5 days) | 75.0 | 40.1 | 20.4 | 15.5 |
| Fracture type | A | A | A | A |

As shown in Table 10, the Lap shear strength was notably improved by adding a biological calcium compound.

EXAMPLES 28 TO 31 AND COMPARISONS 20 to 22

Adhesive compositions were obtained in the same procedure as in Example 1, with the formulating as shown in Table 11. The components were the same as explained above.

For the obtained adhesive compositions, the peeling strength adhesion tests were conducted in the same procedure as in Examples 20 to 22, and results were obtained as shown in Table 11.

TABLE 11

|  | Comparison 20 | Example 28 | Example 29 | Example 30 | Example 31 | Comparison 21 | Comparison 22 |
|---|---|---|---|---|---|---|---|
| Formulating (parts) |  |  |  |  |  |  |  |
| Matrix composition |  |  | Urethane prepolymer: 9.5 Epoxy resin B: 0.5 |  |  |  |  |
| Calcium compound powder | — | Scallop shell powder; 0.5 | Clam shell powder: 0.5 | Egg shell powder: 0.5 | HAp; 0.5 | — | — |
| Powder other than calcium compound | — | — | — | — | — | Synthetic calcium carbonate powder; 0.5 | Sodium metaphosphate; 0.5 |
| Other components |  |  | Aromatic polyamine: 1.2 Dicyan diamide: 0.1 |  |  |  |  |
| T-peel strength [kg/25 mm] | 22.5 | 27.5 | 30.0 | 30.0 | 32.0 | 18.5 | 20.0 |
| Fracture type | AC | C | C | C | C | A | AC |

EXAMPLES 32 TO 35 AND COMPARISONS 23 TO 25

Adhesive compositions were obtained in the same procedure as in Example 1, with the formulating as shown in Table 12. The components were the same as explained above.

For the obtained adhesive compositions, the Lap shear strength tests were conducted in the same manner as in Examples 23 to 25. As for Examples 32 to 35 and Comparisons 23, 24, furthermore, changing the aluminum plates to those in the A-2024P of JIS H 4000, the Lap shear strength tests were also conducted. The results are shown in Table 12.

TABLE 12

|  | Comparison 23 | Example 32 | Example 33 | Example 34 | Example 35 | Comparison 24 | Comparison 25 |
|---|---|---|---|---|---|---|---|
| Formulating (parts) |  |  |  |  |  |  |  |
| Matrix composition |  |  | Epoxy resin B: 10.0 Epoxy resin A: 2.5 |  |  |  |  |
| Calcium compound powder | — | Scallop shell powder; 0.5 | Clam shell powder: 0.5 | Egg shell powder: 0.5 | HAp; 0.5 | — | — |
| Powder other than calcium compound | — | — | — | — | — | Synthetic calcium carbonate powder; 0.5 | Sodium metaphosphate; 0.5 |
| Other components |  |  | Dicyan diamide: 0.2 Latent hardener: 0.2 Aromatic polyamine: 2.7 |  |  |  |  |

TABLE 12-continued

|  | Comparison 23 | Example 32 | Example 33 | Example 34 | Example 35 | Comparison 24 | Comparison 25 |
| --- | --- | --- | --- | --- | --- | --- | --- |
| A-1050P | | | | | | | |
| Lap shear strength [kg/cm$^2$] | 120 | Substrate break | Substrate break | Substrate break | Substrate break | 120 | 110 |
| Fracture type | AC | | | | | AC | AC |
| A-2024P | | | | | | | |
| Lap shear strength [kg/cm$^2$] | 150 | 275 | 275 | 280 | 280 | 155 | — |
| Fracture type | AC | C | C | C | C | AC | |

EXAMPLES 36 TO 41 AND COMPARISON 26

Adhesive compositions were obtained in the same procedure as in Example 1, with the formulating as shown in Table 13. The components were the same as explained above.

For the obtained adhesive compositions, the peeling strength adhesion tests were conducted in the same procedure as in Examples 20 to 22, and the results as shown in Table 13 were obtained.

TABLE 13

|  | Comparison 26 | Example 36 | Example 37 | Example 38 | Example 39 | Example 40 | Example 41 |
| --- | --- | --- | --- | --- | --- | --- | --- |
| Formulating (parts) | | | | | | | |
| Matrix composition | | | Urethane prepolymer: 9.5 Epoxy resin B: 0.5 | | | | |
| Calcium compound powder | — | Scallop shell powder: 0.25 | Scallop shell powder: 0.25 | Scallop shell powder: 0.25 | Clam shell powder: 0.25 | Clam shell powder: 0.25 | Egg shell powder: 0.25 |
| Other components | | | Aromatic polyamine: 1.2 Dicyan diamide: 0.1 | | | | |
| T-peel strength [kg/25 mm] | 22.5 | 28.0 | 27.5 | 30.0 | 28.5 | 29.5 | 30.0 |
| Fracture type | AC | C | C | C | C | C | C |

As shown in Tables 11 to 13, when using biological calcium compounds, an improvement of the adhesive powder was clear in comparison with use of the synthetic calcium compounds or other powder than the calcium compounds. As shown in Table 12, by using a matrix composition the epoxy type, the Lap shear strength was extremely improved.

What is claimed is:

1. An article comprising a first metal surface selected from the group consisting of an aluminum surface and an aluminum alloy surface, and a second metal surface wherein an adhesive composition comprising
   (a) a synthetic resin adhesive matrix which has adhesive properties, selected from the group consisting of an isocyanate compound possessing two or more isocyanate groups, and an epoxy resin; and
   (b) a biological calcium compound having a mean particle size of 10 μm or less which is selected from the group consisting of hydroxyapatite, crushed sea shells and crushed egg shells,
   adheres said surfaces together.
2. The article according to claim 1, wherein said first metal surface is untreated.
3. The article according to claim 1, wherein said second metal surface is untreated.
4. The article according to claim 1, wherein said first and second metal surfaces are untreated.
5. The article according to claim 1, wherein said second metal surface is selected from the group consisting of an aluminum surface and an aluminum alloy surface.
6. The article according to claim 1, wherein said biological calcium compound is hydroxyapatite.

* * * * *